United States Patent [19]

von Hahn

[11] Patent Number: 4,576,812
[45] Date of Patent: Mar. 18, 1986

[54] CHLORINATION OF COPPER, LEAD, ZINC, IRON, SILVER AND GOLD

[76] Inventor: Hardwin E. A. von Hahn, 8464 Adera St., Vancouver, British Columbia, Canada, V6P 5E7

[21] Appl. No.: 619,874

[22] Filed: Jun. 12, 1984

[30] Foreign Application Priority Data

Jun. 17, 1983 [CA] Canada ................................. 430668

[51] Int. Cl.$^4$ ..................... C01G 21/16; C01G 9/04; C01G 3/04; C01G 5/00
[52] U.S. Cl. .................................. 423/491; 423/46; 423/89; 423/99; 423/462; 423/493; 423/494
[58] Field of Search ................ 423/46, 1, 89, 99, 462, 423/491, 493, 494

[56] References Cited

U.S. PATENT DOCUMENTS

| 1,917,231 | 7/1933 | Bacon et al. | 423/46 |
| 1,937,661 | 12/1933 | Meyer | 423/46 |
| 1,946,325 | 2/1934 | Levy | 423/46 |
| 3,906,074 | 9/1975 | Spreckelmeyer | 423/493 |
| 3,988,417 | 10/1976 | Polinsky | 423/493 |
| 3,990,891 | 11/1976 | Sandberg et al. | 423/46 |
| 4,209,501 | 6/1980 | Kruesi | 423/46 |

FOREIGN PATENT DOCUMENTS

| 1135963 | 11/1982 | Canada | 423/46 |
| 0039467 | 4/1913 | Sweden | 423/462 |

Primary Examiner—Andrew H. Metz
Assistant Examiner—Terryence Chapman
Attorney, Agent, or Firm—Townsend and Townsend

[57] ABSTRACT

This invention relates to a process for making the chloride of a metal from the sulfide of said metal in the absence of air and for a metal selected from copper, iron, lead, zinc, silver and gold. The process consists of three broad steps. First, forming an intimate mixture of finely divided sulfides of the metals with finely divided chlorides, the latter being in an anhydrous state. Second, heating the mixture to a temperature at which there is a rapid reaction converting the metal sulfides to chlorides and elemental sulfur in the state of a solid aggregate mixture. Third, recovering the formed metal chlorides from the aggregate mixture by conventional means.

8 Claims, No Drawings

CHLORINATION OF COPPER, LEAD, ZINC, IRON, SILVER AND GOLD

FIELD OF THE INVENTION

This invention is a process for forming a chloride of a metal.

DESCRIPTION OF THE PRIOR ART

The forming of metal chlorides from metals or metal compounds such as oxides, sulfides, carbonates and sulfates is known. The chlorination may be for various purposes, such as the recovery of metals from their ores or the manufacture of the chlorides for subsequent use.

The present commercial methods for treating sulfide ores and concentrates involve roasting and smelting the sulfides in a series of operations which convert the sulfur to volatile sulfur dioxide. The metal values are effectively recovered in these operations. However, the very large volumes of sulfur dioxide produced are not always conveniently recovered, so that serious air pollution can result. As a substitute hydrometallurgical processes are being extensively developed. These processes convert the sulfide to solid elemental sulfur, with the metals being dissolved and recovered by various means.

A major difficulty with the present hydrometallurgical processes is that it is not practically possible to convert all the sulfide sulfur to elemental sulfur. A part of the sulfur is inevitably converted to sulfate which constitutes a waste of energy and a disposal problem. Also, it is not possible with present hydrometallurgical methods to work at very high concentrations of valuable metals, so that large volumes of solutions must be heated, cooled, pumped and processed.

SUMMARY OF THE INVENTION

Accordingly, it is the principal object of this invention to provide a process for the chlorination of metals from their compounds which is substantially pollution free and which obviates other problems of the prior art processes for the recovery of metals from their ores.

In the process of the present invention, an uncombined metal or a metal of a compound such as a sulfide, oxide, carbonate or sulfate, when mixed with one or more metal chlorides, is converted to the corresponding metal chloride and elemental sulfur at low temperature and ambient pressure. One of the metal chlorides must be selected from the group consisting of ferric chloride, ferrous chloride, cupric chloride and cuprous chloride and mixtures thereof.

Chlorine gas and/or sulfur chloride may be added as supplements to the chlorination reaction. It is a requirement that the reaction be conducted in the absence of air. The formed metal chlorides can be recovered from the reaction mixture by various conventional means. The metals for which the process is operative are those of groups 1B, 2A, 2B, 3B, 4A, 5A and 8 of the periodic table and the rare earth metals.

The invention is based on the discovery that metal oxides, sulfides, carbonates and sulfates react with chlorine at relatively low temperatures to give the corresponding metal chlorides. The same is true for uncombined metals. In the case of metal sulfides, for example, rapid and complete conversion to metal chloride occurs. In addition, elemental sulfur is formed as a reaction product. For example, if ferric chloride is mixed with the appropriate metal sulfides and this mixture then heated to the appropriate temperature in the absence of air, it is found that a reaction will occur in which the metal chloride and elemental sulfur will form with the ferric chloride being reduced to ferrous chloride.

In a preferred aspect of the invention the reaction takes place between two or more finely divided solids intimately mixed. The reaction takes place at relatively low temperatures, i.e. below the melting points of the formed chlorides. The reaction products are also finely divided solids that are agglomerated in an easily friable mass. The elemental sulfur produced during the reaction occurs in the reaction products either as a finely divided powder, or as spheroidal globules, or it may evaporate in part, depending on the temperature of reaction. A feature of this type of reaction is that it is characterized by a considerable exothermicity, which results in a concomitant rapid rise in temperature of the reacting solids as the reaction proceeds. The time span of rapid rise of temperature is very short, of the order of a few minutes.

This time span is indicative of the speed at which the reaction proceeds, and also of the points in time and temperature at which the reaction starts and finishes. The temperature required for rapid reaction depends upon the compound or metal being chlorinated and the type of chlorinating agent used.

For example, in the case of the reaction of chalcopyrite with ferric chloride it was found that the reaction starts at about 120° C. and is complete at about 220° C. The time span required for the reaction to proceed is about five minutes. And again for example, in the case of the reaction of galena with ferric chloride the reaction starts at about 30° C. and is complete at about 140° C. The time span required for the reaction to proceed is about two minutes.

It is a decided advantage of the invention that it is operated at temperatures below the softening point of glass, which is about 550° C. In view of this the chlorination reactions can be performed in glass equipment or in glass lined equipment.

The source of chlorine for the chlorination reaction is supplied by chlorine gas, sulfur monochloride or a chlorine donor, such as ferric chloride, cupric chloride or mixtures of these. The reaction is conducted in the absence of air to prevent formation of sulfur dioxide.

When the reaction mixture contains ferric chloride or cupric chloride or mixtures of these then the further addition of chlorine or a chlorine source is not necessary. When ferrous chloride or cuprous chloride or mixtures of these constitute a component of the reaction mixture then chlorine gas or sulfur monochloride may be supplied to the mixture to convert a portion or all of the ferrous chloride and/or cuprous chloride to ferric chloride and/or cupris chloride, and/or to react directly with the metal or metal sulfide to form the chloride of the metal. Chlorine and/or sulfur monochloride can be added as supplemental sources of chlorine to reaction mixtures to cause regeneration of the chlorine donors and to react with the metal sulfide.

The needed iron chloride and/or copper chloride can be supplied to the reaction mixture through the reaction between a metal ore or concentrate containing iron and/or copper and chlorine. Examples of such ores or concentrates are those containing chalcopyrite and pyrite.

As to the recovery of elemental sulfur from the reaction products this can be achieved by its volatilization at temperatures near 445° C., the boiling point of sulfur, and its recondensation at lower temperatures.

The metal compounds for which the process is operative are those of the metals of groups 1B, 2A, 2B, 3B, 4A, 5A, and 8 of the periodic table and the rare earth metals. The compounds of the metals for which this process is operative are the oxides, sulfides, carbonates and sulfates. The process is operative for chlorinating metals, such as iron, in the uncombined state.

The compounds which are operative for the reaction mixtures are the chlorides of metals, such as iron and copper, which can exist in at least two valency states. This is because the chlorides of these metals are then capable during the chlorination reaction of being reduced to a lower valency state and thereby serving as chlorine donors.

The amount of the metal compound which can be reacted with a chlorine donor, varies with the reactants and the composition of the mixture of reacting solids. For example, the amount of sulfides that can be reacted with a given amount of ferric chloride and/or cupric chloride is a function of the reaction stoichiometry and the presence of non-reacting metal compounds such as metal chlorides of lower valence states among which can be cited cuprous chloride, ferrous chloride, lead chloride, silver chloride, gold chloride.

The process is illustrated by reference to certain specific minerals. Chalcopyrite reacts with ferric chloride according to the following reaction:

$$CuFeS_2 + 3FeCl_3 \rightarrow CuCl + 4FeCl_2 + 2S°$$

or with cupric Chloride according to the following reaction:

$$CuFeS_2 + 3CuCl_2 \rightarrow 4CuCl + FeCl_2 + 2S°$$

Similarly galena, sphalerite and pyrrhotite react with ferric chloride according to the following reactions:

$$PbS + 2FeCl_3 \rightarrow PbCl_2 + 2FeCl_2 + S°$$

$$ZnS + 2FeCl_3 \rightarrow ZnCl_2 + 2FeCl_2 + S°$$

$$Fe_{(1-x)}S + 2(1-x)FeCl_3 \rightarrow 3(1-x)FeCl_2 + S°$$

Similar reactions can be written if cupric chloride were the chlorine donor.

Chlorination of metal oxides presents a somewhat different problem than chlorination of the sulfides in that a reductant such as carbon or sulfur is additionally frequently added to the reaction mixture. If the metal oxide is mixed with ferric chloride, for example, along with a suitable reductant such as carbon or sulfur, the oxide will be reduced and the corresponding metal chloride formed. Reaction temperatures will depend upon the metal being chlorinated. Base metal oxides such as copper, lead and zinc oxides chlorinate readily below 400° C. Rare earth metal oxides also chlorinate rapidly at 400° C.

The chlorination of oxides is illustrated by the following reactions:

$$Fe_2O_3 + 1.5C + 4FeCl_3 \rightarrow 6FeCl_2 + 1.5CO_2$$

$$PbO + 0.5C + 2FeCl_3 \rightarrow PbCl_2 + 2FeCl_2 + 0.5CO_2$$

$$La_2O_3 + 1.5C + 3Cl_2 \rightarrow 2LaCl_3 + 1.5CO_2$$

$$La_2O_3 + 1.5S + 3Cl_2 \rightarrow 2LaCl_3 + 1.5SO_2$$

In addition to oxides, sulfates may be chlorinated in the same manner. An example is:

$$BaSO_4 + C + Cl_2 \rightarrow BaCl_2 + CO_2 + SO_2$$

In each case the important factor that permits good chlorination at low temperature is that the reactants are finely divided solids intimately mixed.

The recovery of the formed chloride compounds from the reaction product mass may be accomplished by conventional methods. This could include, for example, one or more of the following steps: comminution of the agglomerated reaction product mass, removal of the residual elemental sulfur by evaporation at or near 445° C., the boiling point of sulfur, chlorination of the residual mass with chlorine to convert ferrous chloride to ferric chloride, removal of the ferric chloride by volatilization at or near 315° C., the boiling point of ferric chloride, leaching of the residual mass in aqueous solutions to solubilize the valuable metals such as copper, lead, zinc and the precious metals, recovery of the valuable metals from the solutions by various conventional means such as electrolysis, precipitation, etc. The volatilized ferric chloride may be condensed and recycled in part or all, as required, for the chlorination of further reactants by the method described in this invention. That part of the volatilized ferric chloride which is not recycled may be treated to recover chlorine or dispose of or utilize the accruing iron compounds in accordance with economic circumstances. For example, the ferric chloride may be reacted with oxygen or air at or about 800° C. to recover chlorine according to the following reaction:

$$2FeCl_3 + 1.5O_2 \rightarrow Fe_2O_3 + 3Cl_2$$

The ferric oxide may be disposed of or utilized in the production of metallic iron.

One advantage of the chlorination process described in this invention is that it allows for the convenient removal of iron, which is often a major constituent in the reaction products, by an alternate method, i.e. volatilization of ferric chloride, which avoids the problem commonly associated with wet chemical or hydrometallurgical methods, namely the production of large quantities of ferric hydroxides and/or jarosites which are difficult to filter or settle and often cause great problems in separation and storage.

Although the particle size of the metal ore, concentrate, compound, etc. is not critical a particle size of ½ inch or more can be used. Obviously, the more of the sample which is ground to a small particle size, the more surface area will be available for the chlorination reaction and, accordingly, the more effective the chlorination will be in terms of reaction rate and completion of reaction. In the following examples the particle size varied from 10% +200 mesh to 95% −325 mesh.

The invention is illustrated by the examples which follow which are not limiting of the invention. In the following examples chlorine and/or the chlorine donor was in excess of the amount required to convert the metal sulfides to their chlorides.

EXAMPLE 1

Ten grams of a dried chalcopyrite concentrate containing 28.85% copper, mainly as chalcopyrite, and 29.49% iron was mixed with 37.55 grams of anhydrous ferric chloride. The reaction mixture was heated, in the absence of air, from room temperature to 240° C. during a time interval of 10 minutes. The reaction product was a solid cake which was easily friable. It was cooled and dissolved in an aqueous solution, acidified to 6 molar hydrochloride acid. 90.6% Of the copper and 84.7% of the iron from the concentrate went into solution. The insoluble residue comprised 3.65 grams or 36.5% of the chalcopyrite concentrate. Microscopic examination of the residue showed the presence of considerable amounts of very finely divided elemental sulfur. The chemical analysis of the residue was as follows: 7.55% copper, 12.4% iron, 63.6% sulfur, 14.4% acid insoluble matter. The recovery of elemental sulfur was calculated to be 56.9% on the basis that the copper and iron in the residue are present as sulfides. The balance of the sulfur evaporated during the reaction.

EXAMPLE 2

Ten grams of a dried galena concentrate, containing 60.6% lead, 4.46% zinc, as sphalerite, 9.95% iron, as pyrrhotite, was mixed with 25 grams of anhydrous ferric chloride. The reaction mixture was heated in the absence of air for about 5 seconds, until a temperature of 30° C. was reached. At that point a rapid rise in temperature set in, such that during the next 150 seconds it reached 140° C. The heater had been removed after 15 seconds when the temperature had reached 100° C. During a further 35 seconds the temperature rose to 141° C. and then started to drop. The reaction product, which was an agglomerated, easily friable cake, was allowed to cool. Part of this cake was dissolved in hot water by means of repeated washings. 99.5% Of the lead, 37.0% of the iron and 29.9% of the zinc from the concentrate went into solution. The insoluble residue comprised 24.7% of the galena concentrate.

Microscopic examination of the residue revealed the presence of considerable amounts of very finely divided elemental sulfur. The chemical analysis of the residue was as follows: 1.18% lead, 13.40% zinc, 25.4% iron, 51.8% sulfur. The recovery of elemental sulfur was calculated to be 39.2% on the basis that the zinc and iron in the residue are present as sulfides. The solution contained 1.5% of the sulfur. The balance of sulfur had evaporated during the reaction.

I claim:

1. A process for making the choloride of a metal selected from the group consisting of copper, iron, lead, zinc, silver and gold from the sulfide of the selected metal in the absence of air which comprises:
(a) forming an intimate mixture of a solid finely divided sulfide of the selected metal with a solid chlorine source selected from the group consisting of ferric chloride, cupric chloride and mixture thereof in any proportions;
(b) heating said mixture to a temperature, below the melting points of said sulfide and said chlorine source, at which a rapid reaction takes place converting said metal sulfide to a metal chloride and elemental sulfur in the state of a solid aggregate mixture;
(c) recovering said metal chloride from said solid aggregate mixture.

2. The process of claim 1 performed at a temperature of from about −10° C. to about 650° C.

3. The process of claim 1 wherein the metal sulfide is a copper sulfide.

4. The process of claim 1 wherein the metal sulfide is a lead sulfide.

5. The process of claim 1 wherein the metal sulfide is a zinc sulfide.

6. The process of claim 1 wherein the metal sulfide is an iron sulfide.

7. The process of claim 1 wherein the metal sulfide is a gold sulfide.

8. The process of claim 1 wherein the metal sulfide is a silver sulfide.

* * * * *